United States Patent Office

3,297,725
Patented Jan. 10, 1967

3,297,725
EPOXYENDOALKYLENEHEXAHYDRO-PHTHALATE ESTERS
Wolfgang Gündel, Dusseldorf-Oberkassel, and Gerhard Dieckelmann, Dusseldorf-Holthausen, Germany, assignors to Dehydag, Deutsche Hydrierwerke G.m.b.H., Dusseldorf, Germany, a corporation of Germany
No Drawing. Filed May 2, 1958, Ser. No. 732,460
Claims priority, application Germany, Feb. 22, 1954, D 17,100
4 Claims. (Cl. 260—348)

This is a continuation-in-part of copending application Serial No. 489,736, filed February 21, 1955, now abandoned.

This invention relates to stabilized highly polymerized plastic compositions and to a process for producing the stabilizing softeners and plasticizers used therefor.

It is well known that halogenated polymerized plastic compositions, such as chlorinated rubber, polyvinyl chloride, polyvinylidene chloride and the like, have a tendency to split off halogen acid molecules as a consequence of intramolecular reaction under the influence of heat or light. The halogen acid thus split off gives rise to an accelerated and far-reaching decomposition of the polymeric structure which renders such compositions unstable and seriously interferes with the plasticizing step in the manufacture of such polymerized compositions.

A number of compounds have been proposed and used which, when admixed with the halogenated polymerized plastic compositions mentioned above, tend to stabilize the polymeric structure because of their capability of binding the halogen acid split off under the action of heat or light, forming neutral chlorohydrins. Such compounds are usually referred to as self-stabilizing softeners or plasticizers.

Among the large number of self-stabilizing compounds which are known in the art, those which contain epoxide groups have been found to be particularly suitable These epoxy compounds can be readily and very simply produced from esters of unsaturated fatty acids, for example from oleic acid, by epoxidizing the double bonds present therein.

The improvements brought about by the discovery of the stabilizing effect of these epoxidized olefinic compounds upon halogenated polymeric compounds were highly valued in the beginning, particularly since it appeared that the technically relatively simple introduction of epoxy-groups into fats and fatty products of an aliphatic nature would offer an opportunity to produce cheap and yet effective softeners from fats and fatty products which, in their unepoxidized form, are practically incompatible with halogenated vinylpolymerizates and since such epoxidized softeners could readily be used in large quantities as softeners in general.

This expectation, however, was only partially realized, since it was subsequently found that an appreciable transformation of the epoxy-groups into chlorohydrin-groups in fulfillment of their stabilizing role again partially reduces their compatibility with polyvinyl chloride or any other halogenated polymerizate, whereby the softener is caused to sweat out of the plasticized polymeric composition.

A further disadvantage of the softeners produced by epoxidizing aliphatic unsaturated acids was found to be that the transformation of the double bonds in the fatty products into epoxy-groups is under certain circumstances accompanied by a considerable increase of the melting point of the fatty compound to an extent corresponding in degree of magnitude to the increase in the melting point occurring upon hardening of the fatty compound. In some cases, also, and particularly upon complete epoxidation of the fatty acid, the products produced thereby had a tendency to crystallize even at low temperatures, which is a highly undesirable characteristic for softeners for plastic polymerizates.

It is an object of the present invention to provide stable halogenated polymer compositions containing self-stabilizing softeners and plasticizers which are compatible with the halogenated polymer component under practically all conditions.

Another object of the present invention is to provide stable halogenated polymer compositions containing self-stabilizing softeners and plasticizers which do not sweat out of the plasticized polymer composition.

Other objects and advantages of the invention will become apparent as the description thereof proceeds.

We have found that effective stabilizing softeners and plasticizers for halogenated polymers are obtained by epoxidizing esters of monobasic or polybasic unsaturated cycloaliphatic carboxylic acids with the aid of organic peroxy-acids or mixtures of hydrogen peroxide and organic acids which form organic peroxy-acids, whereby an epoxide group is formed at the cycloaliphatic double bond. The epoxidized product is readily compatible with halogenated polymeric compounds, such as chlorinated rubber, polyvinyl chloride, polyvinylidene chloride and the like, under virtually all conditions, and does not sweat out of the plasticized composition in its chlorohydrin form.

The esters used as starting materials in the production of the stabilizing softeners in accordance with our invention are themselves highly compatible with halogenated polymers, and the chlorohydrins formed by the stabilizing action from the epoxy esters were found to be adequately compatible with film-forming substances to prevent them from sweating out of the plasticized composition. Moreover, the melting points of the starting esters are in general so low that the increase in the crystallization point of these esters brought about by the introduction of an epoxy-group therein does not render them undesirable for use as plasticizing or softening agents.

Examples of unsaturated cycloaliphatic carboxylic acids the esters of which may be epoxidized to form stabilizing softeners in accordance with our invention are the following:

$\Delta^3$-tetrahydrobenzoic acid
2-methyl-$\Delta^3$-tetrahydrobenzoic acid
2,5-endomethylene-$\Delta^3$-tetrahydrobenzoic acid
$\Delta^4$-tetrahydrophthalic acid
3-methyl-$\Delta^4$-tetrahydrophthalic acid
3,6-endomethylene-$\Delta^4$-tetrahydrophthalic acid
1-methyl-3,6-endomethylene-$\Delta^4$-tetrahydrophthalic acid
3,6-endoethylene-$\Delta^4$-tetrahydrophthalic acid
3,6-endoxo-$\Delta^4$-tetrahydrophthalic acid and other acids of similar and analogous structure, such as those which are obtainable very readily and with good yields by the well-known diene-synthesis.

To form suitable starting esters, the above acids may be esterfied with any desired monovalent or bivalent aliphatic, cycloaliphatic or aromatic-aliphatic alcohol. The carbon chain or ring of this alcohol may also be interrupted by heteroatoms or heteroatom groups. If desired, the acids may also be esterified with an unsaturated alcohol, so that the oxidation of the resulting ester with the peroxy-acid forms additional epoxy-groups in the alcoholic ester component.

Examples of alcohols which may be advantageously used to esterify the unsaturated cycloaliphatic carboxylic acid and form suitable esters for the production of epoxidized softeners and plasticizers in acordance with our invention are the following:

Ethanol
Butanol
2-ethylbutanol
Cyclohexanol
Methylcyclohexanol
n-Octanol
2-ethylhexanol
n-Decanol
n-Dodecanol
n-Octadecanol
Octadecenol (oleyl alcohol)
Benzyl alcohol
Hexahydrobenzyl alcohol
Butoxyethanol
Tetrahydrofurfurol
Phenoxyethanol and the like, as well as mixtures of alcohols such as are obtained by a catalytic reduction of fatty acids produced by the oxidation of paraffins containing, for example, from 4 to 6 or from 7 to 9 carbon atoms. Other examples of suitable alcohols or mixtures thereof are those which, starting with olefins obtained from a petroleum cracking process, can be produced by catalytic addition of carbon monoxide and hydrogen and a subsequent hydrogenation of the resulting hydrocarbons in accordance with the well-known oxo-process.

Still further examples of alcohols which may be used to form the starting esters are alcohols which contain branch chains, such as those produced by the Guerbet process (Weizmann et al., Chemistry and Industry, vol. 15 (1937), page 587 et seq., and Machemer, Zeitschrift fur Angewandte Chemie, vol. 64 (1952), page 213 et seq.) from low-molecular alcohols. Finally, bivalent alcohols, such as ethyleneglycol, 1,4-butanediol, 1,6-hexanediol, diethyleneglycol, and the like, may also be used to esterify the unsaturated cycloaliphatic carboxylic acids, even if the acids involved are unsaturated cycloaliphatic dicarboxylic acids, since we have found that high-molecular polyesters of this type may also be transformed into epoxy-polyesters by the method described below.

The starting esters may be epoxidized with organic peroxy-acids to form the self-stabilizing softeners according to the present invention by any of the methods known in the art. A particularly advantageous method comprises reacting an ester of an unsaturated cycloaliphatic carboxylic acid with a mixture of a 30 to 40% hydrogen peroxide solution and an organic carboxylic acid capable of forming a peroxy-acid, at temperatures between 30° and 60° C., and accompanied by vigorous stirring of the reaction mixture. While the most favorable ratio of reactants may vary slightly, depending upon the particular reaction components used, we have found that if formic acid is used as the peroxy-acid-forming organic carboxylic acid, the ratio of about 1.2 to 1.5 mols hydrogen peroxide and about 0.1 to 0.5 mol formic acid for each mol of ester to be epoxidized is most advantageous. Formic acid is a particularly good peracid-forming compound because in admixture with hydrogen peroxide the equilibrium between the performic acid and the peroxide mixture is more rapidly reached than in the case of most other organic carboxylic acids.

A particularly safe method of bringing the unsaturated cycloaliphatic carboxylic acid ester into contact with the peracid component to bring about an epoxidation of the double bonds of the ester comprises first admixing the ester with the formic acid and then adding the hydrogen peroxide to the mixture under the desired reaction conditions, i.e. at a temperature between 30° and 60° C. and while vigorously stirring the reaction mixture. However, the epoxidation reaction may also be brought about by first admixing the ester with hydrogen peroxide and then slowly adding the formic acid to the ester-peroxide mixture. Either of these two methods makes it possible to maintain the free peracid content of the reaction mixture at a relatively low level throughout the reaction.

Examples of epoxy-esters which we have found to be highly compatible softeners for halogenated polymerizates, and which may readily be produced by the above-described methods from their corresponding unsaturated cycloaliphatic carboxylic acid esters, are the following:

3,4-epoxy-hexahydrobenzoic acid-decyl ester
2,5-endomethylene-3,4-epoxy-hexahydrobenzoic acid-isododecyl ester
4,5-epoxy-hexahydrophthalic acid-dibutyl ester
4,5-epoxy-hexahydrophthalic acid-di-2-ethylhexyl ester
4,5-epoxy-hexahydrophthalic acid-di-butoxyethyl ester
4,5-epoxy-hexahydrophthalic acid-di-benzyl ester
4,5-epoxy-hexahydrophthalic acid-di-cyclohexyl ester
4,5-epoxy-hexahydrophthalic acid-n-octyl-methylcyclohexyl ester
4,5-epoxy-hexahydrophthalic acid-di-9,10-epoxy-octadecyl ester
4,5-epoxy-3,6-endomethylene-hexahydrophthalic acid-diethyl-butyl ester
4,5-epoxy-3,6-endomethylene-hexahydrophthalic acid-di-n-octyl ester
4,5-epoxy-3,6-endomethylene-hexahydrophthalic acid-di-9,10-epoxy-octadecyl ester as well as epoxy-polyesters, such as those formed by 4,5-epoxy-hexahydrophthalic acid and 1,6-hexanediol or by 4,5-epoxy-hexahydrophthalic acid, 1,4-butanediol and a chain-splitting fatty acid, such as capric acid, for example.

The formation of the epoxidized cycloaliphatic esters takes place very smoothly and, as a rule, somewhat more rapidly than the formation of epoxy-fatty acid esters from the esters of aliphatic unsaturated fatty acids. This is particularly surprising since the esters of the simplest members of the unsaturated aliphatic mono- or dicarboxylic acid series, namely the esters of acrylic acid and maleic acid, do not, under ordinary conditions, form epoxidized esters in which the epoxy-group is in the acid component of the ester.

The epoxidation reaction which yields the epoxy-esters of unsaturated cycloaliphatic acids, as described above, also forms certain amounts of dioxy-esters as side-products. The amount of dioxy-esters formed depends upon the reaction temperature. In general, the amount of dioxy-esters formed as a side product in the epoxidation reaction increases as the reaction temperature increases. The presence of traces of a mineral acid in the reaction mixture also favors the formation of dioxy-esters. However, the formation of these dioxy-esters remains within reasonable limits and their presence does not interfere with the use of the epoxy-esters of unsaturated cycloaliphatic acids as softeners and plasticizers in accordance with our invention. In fact, their presence during the admixture of the softeners with the halogenated polymerizate contributes toward reducing the stickiness of the plasticized mass.

The incorporation of the epoxy-ester softeners with the halogenated polymerizates, according to our invention, requires no special procedures. The epoxy-esters can be incorporated as softeners in the same manner and under the same conditions as any of the softeners known in the art. The novel epoxy-esters may even be used in combination with known softeners. Such as dibutyl phthalate, dicetyl phthalate, dioctyl adipate, di-2-ethylhexyl sebacate, di-butoxy-ethyl-phthalate, di-methylcyclohexyl phthalate, aryl esters of alkyl sulfonic acids, tricresyl phosphate, mixed alkyl aryl phosphates and the like. The amounts added to the halogenated polymerizates may range from 1 to 100 by weight, but a range from 30 to 70 by weight is preferred, if they are used alone.

The epoxy-ester softeners according to our invention are fully compatible and do not tend to sweat out of the plasticized composition. They further have an excellent stabilizing effect upon the halogenated polymerizates under the action of both light and heat, even when used together with other softeners or plasticizers. The following examples will illustrate methods for producing the stabilizing softeners and plasticizers employed according to the present invention.

*Example 1*

280 parts by weight of $\Delta^4$-tetrahydrophathalic acid-dibutylester (1 mol) and 127.5 parts by weight of a 40% solution of hydrogen peroxide (1.5 mols) were placed into a vessel provided with a stirring device, a thermometer and a cooling jacket. Thereafter, 18 gm. of an 85% solution of formic acid (0.3 mol) were slowly added to the mixture over a period of 15 minutes while maintaining the reaction mixture at a temperature between 50 and 60° C., accompanied by vigorous stirring. The epoxidation reaction was permitted to continue for eight hours, whereupon the aqueous and the acid components of the reaction mixtures were separated from each other. The epoxy-ester formed by the reaction was then extracted with a 4% solution of sodium hydroxide. Finally, the epoxidized ester was washed to neutral reaction and dried. The resultant product was a colorless liquid having an epoxy-oxygen content of about 3%, corresponding to a content of 4,5-epoxy-hexahydrophthalic acid-dibutyl ester of about 50%.

*Example 2*

336 parts by weight of the di-2-ethylhexyl ester of $\Delta^4$-tetrahydrophthalic acid (1 mol) were reacted with formic acid and hydrogen peroxide at 45° C. in the manner described in Example 1. The resultant product was a colorless oil which contained about 78% 4,5-epoxy-hexahydrophthalic acid-di-2-ethylhexyl ester. The oil had an epoxide-oxygen content of 3.7%.

*Example 3*

392 parts by weight of $\Delta^4$-tetrahydrophthalic acid-di-n-octyl ester (1 mol) were admixed with 18 gm. of an 85% solution of formic acid (0.3 mol), and 120 parts by weight of a 40% solution of hydrogen peroxide (1.4 mols) were then slowly added to the mixture while maintaining the temperature of the reaction mixture at 45° C. and vigorously stirring the same. The reaction was allowed to continue over a period of 10 hours at about 40° C. and the oxidation product produced thereby was then separated in the form of a colorless oil. The oil had an epoxide-oxygen content of 3.2% and contained 80% 4,5-epoxy-hexyhydrophthalic acid-di-n-octylester.

An analogous product was obtained when the neutral 2-ethylhexyl ester was reacted under the above conditions instead of the neutral n-octyl ester.

*Example 4*

348 parts by weight of 3,6-endomethylene-$\Delta^4$-tetrahydrophthalic acid-di-2-ethylbutyl ester (1 mol) were epoxidized in the presence of 23 parts by weight of a 90% solution of formic acid (0.4 mol) and 127.5 parts by weight of a 40% solution of hydrogen peroxide (1.5 mols) over a period of 12 hours at a temperature between 35 and 40° C. The resultant product was a colorless oil having an epoxy-oxygen content of 3.8% and contained about 83% of the 4,5-epoxy-3,6-endomethylene-hexahydrophthalic acid-di-2-ethylbutyl ester.

*Example 5*

584 parts by weight of $\Delta^4$-tetrahydrophthalic acid-di-oleyl ester (1 mol) were epoxidized by admixing the ester with 340 parts by weight of a 40% solution of hydrogen peroxide (4 mols) and then slowly adding 48.5 parts by weight of an 85% solution of formic acid (0.9 mol) to the mixture. The reaction was allowed to continue for about 12 hours at a temperature of about 45° C., accompanied by vigorous stirring of the reaction mixture. The resulting product was a light-colored oil having an epoxide-oxygen content of 5.4%, corresponding to a yield of 4,5-epoxy-hexahydrophthalic acid-di-9,10 - epoxyoctadecyl ester of about 70% of the theoretical yield.

*Example 6*

396 parts by weight of a mixture of esters, produced by esterifying $\Delta^4$-tetrahydrophthalic acid with a mixture of equimolar amounts of n-decanol and benzyl alcohol, were epoxidized in the manner described in Example 3. The resultant product was a colorless oil having an epoxide-oxygen content of about 3%.

*Example 7*

33.5 parts by weight of an 85% solution of formic acid (0.6 mol) were admixed with 306 parts by weight of 1,4-butanediol-di-$\Delta^3$-tetrahydrobenzoate (1 mol), produced by esterifying $\Delta^3$-tetrahydrobenzoic acid with 1,4-butanediol, and thereafter 212 parts by weight of a 40% solution of hydrogen peroxide were slowly added to the above mixture. The oxidation reaction was allowed to continue for eight hours. Further treatment of the reaction mixture as described in Example 1 resulted in a yield of epoxidized benzoate corresponding to about 75% of the theoretical yield.

*Example 8*

314 parts by weight of a polyester (1 mol), produced by reacting 228 gm. $\Delta^4$-tetrahydrophthalic acid, 235 gm. 1,6-hexanediol and 34.2 gm. capric acid in the presence of 0.2 gm. zinc chloride in the manner described in Ind. Eng. Chem. 1953, page 1060, were admixed with 16 parts by weight of an 85% solution of formic acid (0.3 mol), and then 136 parts by weight of a 40% solution of hydrogen peroxide (1.6 mols) were added to the mixture while maintaining the reaction mixture at a temperature between 50 and 55° C. and vigorously stirring the same. The polyester had an acid number of 0.4, a saponification number of 409 and an iodine number of 27; its molecular weight, cryoscopically determined in a medium of benzene, was found to be 1350 and the equivalent weight, derived from the iodine number, was about 314. The oxidation reaction was allowed to continue for about 13 hours. Thereafter, the reaction mixture was allowed to stand until the aqueous and the acid components had separated. The aqueous layer was then decanted. In order to remove the acid-aqueous components more completely, the epoxidized polyester was dissolved in a substantial amount of a higher alcohol, such as butanol, for example, and the solution was first washed with dilute alkali and then with water. The purified solution was dried and the alcohol was distilled off. The epoxy-polyester remaining behind was a viscous, light-brown oil having an epoxide-oxygen content of 3.1%, corresponding to a degree of epoxidation of about 60% of theory.

The epoxidized ester products produced in all of the above examples, when incorporated in halogenated polymerizates of the compositions above set forth, were found to be excellent stabilizing softeners and plasticizers for halogenated polymerizates. As softeners, they were found to be highly compatible with the polymerizates and did not sweat or crystallize out of the plasticized polymeric composition.

The following examples are illustrative of the broad class of stable halogenated polymer compositions produced with the aid of the stabilizing softeners and plasticizers according to the present invention.

*Example 9*

50 parts by weight polyvinyl chloride and 50 parts by weight of the neutral 4,5-epoxy-3,6-endomethylene-hexahydrophthalic acid di-n-octyl ester were intimately admixed with each other by stirring at room temperature. A paste having an excellent viscosity stability was obtained. This paste was eminently suitable for the production of shaped articles by the immersion method. By heating it to 155 to 165° C. it was homogenized into an elastic mass which produced plastic articles and coatings with extraordinary resistance against cold and heat.

Example 10

100 parts by weight chlorinated rubber were dissolved in 600 parts by weight of an organic solvent mixture consisting essentially of aromatic hydrocarbons. 25 parts by weight of the neutral 4,5-epoxy-hexahydrophthalic acid di-n-butyl ester were added to the solution. Thereafter, the solvent mixture was evaporated, leaving a soft, highly elastic, light-fast chlorinated rubber film behind.

Example 11

When the neutral 4,5-epoxy-1-methyl-3,6-endomethylene-hexahydrophthalic acid di-cyclohexyl ester was substituted for the epoxide softener in Example 10, an elastic chlorinated rubber film, having a high resistance against decomposition by water or oil, excellent aging stability and extraordinary light stability, was obtained.

Example 12

95 parts by weight polyvinyl chloride free from emulsifiers, 5 parts by weight of the neutral, 4,5-epoxy-3,6-endoethylene-hexahydrophthalic acid di-methylcyclohexyl ester and 2 parts by weight of an organo-tin stabilizer were intimately admixed with each other by kneading on heating rollers at about 160° C. A plastic mass was obtained which was eminently useful in the production of foils for packaging purposes of all types. The foils thus obtained had a high surface hardness, a high resistance against decomposition by moisture, and were marked by excellent transparency and clearness.

Example 13

65 parts by weight polyvinyl chloride having a K-value of 70 and 35 parts by weight of the neutral 4,5-epoxy-3,6-endoxo-hexahydrophthalic acid di-benzyl ester were intimately admixed by working on friction rollers at 155 to 165° C. An elastic mass was obtained which was eminently suitable for the production of foils intended for use in the manufacture of pillows, apparel, table coverings, and the like.

Example 14

The same results as in Example 13 were obtained when the epoxide softener used in that example was substituted by the neutral epoxidized ester formed by a mixture of aliphatic alcohols having from 7 to 9 carbon atoms, obtained by catalytic reduction of paraffin oxidation fatty acids, and 3,6-endomethylene-$\Delta^4$-tetrahydrophthalic acid.

Example 15

100 parts by weight of a mixed polymerizate of 84 parts vinyl chloride and 16 parts acrylic acid methyl ester were admixed with 60 parts of the neutral, 4,5-epoxy-hexahydrophthalic acid di-2-ethylhexyl ester on a friction roller at 140 to 150° C. The plastic mass thus obtained was highly stable against decomposition by heat and was eminently suitable for use as electric cable insulation.

Example 16

72 parts by weight polyvinyl chloride, free from emulsifiers, 20 parts by weight of the neutral di-2-ethylbutyl ester and 8 parts by weight of the neutral di-n-dodecyl ester of 4,5-epoxy-3-methyl-hexahydrophthalic acid were intimately admixed on heated rollers at about 160 to 170° C. An elastic mass was obtained which had excellent dielectric properties and a high resistance against aging. It was eminently useful in the production of sprayed plastic coatings on electric cables.

Example 17

12 parts by weight chlorinated rubber were dissolved in 800 parts by weight of a suitable solvent mixture consisting essentially of aromatic hydrocarbons. 12 parts by weight of the neutral 4,5-epoxy-hexahydrophthalic acid di-9,10-epoxy-octadecyl ester were added to this solution. After evaporating the solvent mixture, a supple, heat-resistant lacquer film was obtained.

Example 18

The same result as in Example 17 was obtained when the epoxide plasticizer in the example was replaced by an equal quantity of the di-butoxy-ethanol ester of 4,5-epoxy-hexahydrophthalic acid.

Example 19

60 parts by weight polyvinyl chloride having a K-value of 70 and 40 parts by weight of the neutral 4,5-epoxy-hexahydrophthalic acid di-tetrahydrofurfuryl ester were homogenized on a heated roller at about 160° C. A plastic mass was obtained which was eminently suitable for the production of foils of all types. These foils were highly resistant against decomposition by water and retained their excellent suppleness in extreme cold. In addition, the foils were extraordinarily stable when exposed to light and extreme heat for extended periods.

Example 20

The results according to Example 19 were also obtained when the epoxidized tetrahydrofurfuryl ester in that example was replaced by the epoxidized polyester prepared from 1,4-butanediol and $\Delta^4$-tetrahydrophthalic acid.

Example 21

100 parts by weight of polyvinyl chloride having a K-value of 70, 25 parts by weight of dioctyl phthalate and 15 parts by weight of the neutral 4,5-epoxy-hexa hydrophthalic acid di-2-ethylhexyl ester were admixed on a friction roller at 160–165°. The plastic mass thus obtained was highly stable against light and decomposition.

While we have given certain specific embodiments of our invention, we wish it to be understood that the invention is not limited to such embodiments, and that various changes and modifications may be made therein without departing from the spirit of our invention or the scope of the appended claims.

We claim:

1. A new composition of matter of the formula $$\begin{array}{c} CH\text{---}CH\text{---}CH\text{---}COOR^7 \\ O \diagup \quad | \quad CH_2 \quad | \\ \diagdown CH\text{---}CH\text{---}CH\text{---}COOR^8 \end{array}$$

in which $R^7$ and $R^8$ are alkyl radicals of six to eighteen carbon atoms.

2. Dioctyl 4,5-epoxy-3,6-endomethylene-hexahydrophthalate.

3. Dihexyl 4,5-epoxy-3,6-endomethylene-hexahydrophthalate.

4. Didecyl 4,5-epoxy-3,6-endomethylene-hexahydrophthalate.

References Cited by the Examiner

UNITED STATES PATENTS

| | | | |
|---|---|---|---|
| 2,449,959 | 9/1948 | Staudinger et al. | 260—31.8 |
| 2,537,845 | 1/1951 | Morris et al. | 260—78.4 |
| 2,794,030 | 5/1957 | Phillips et al. | 260—30.4 |
| 2,963,490 | 12/1960 | Rowland et al. | 260—30.4 |

LEON J. BERCOVITZ, *Primary Examiner.*

DANIEL ARNOLD, *Examiner.*

ERVIN MARCUS, M. FOELAK, W. H. SHORT, J. P. FRIEDENSON, G. W. RAUCHFUSS,
*Assistant Examiners.*